S. M. KITCHEN.
METHOD OF MAKING SCYTHES.
APPLICATION FILED APR. 19, 1917.
1,257,880.
Patented Feb. 26, 1918.
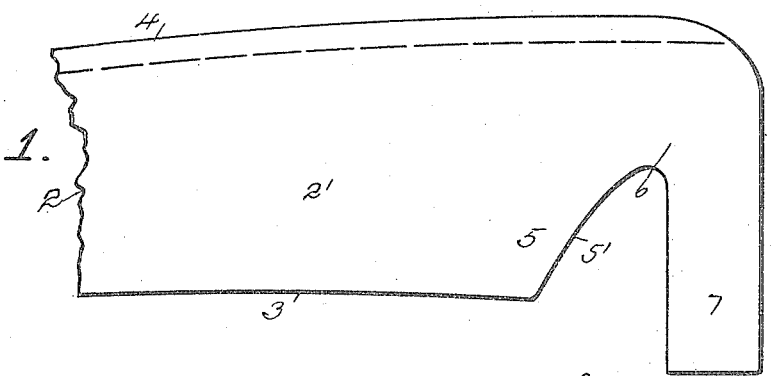
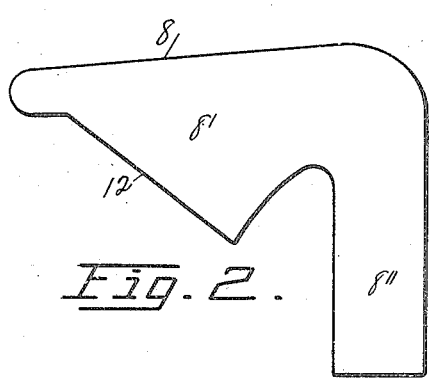
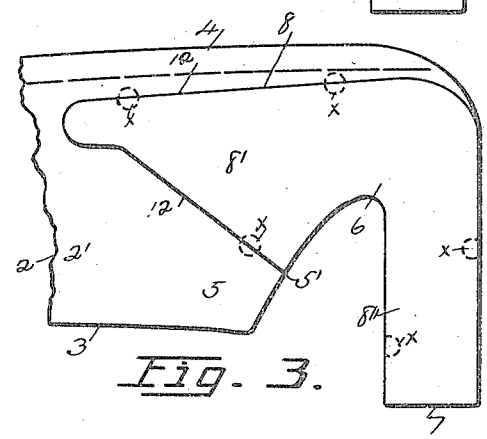
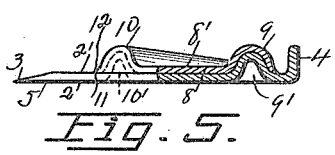
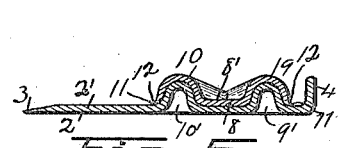
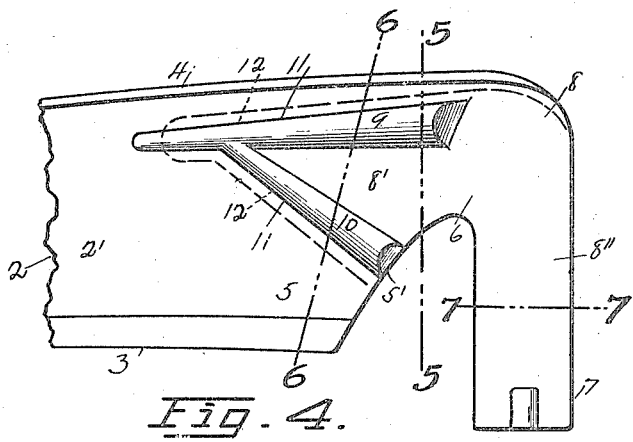
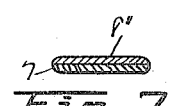
WITNESS
INVENTOR
Samuel M. Kitchen
BY
ATTORNEY

UNITED STATES PATENT OFFICE.

SAMUEL M. KITCHEN, OF SALEM, NEW YORK, ASSIGNOR TO BARTLETT ALL STEEL SCYTHE COMPANY, INC., A CORPORATION OF NEW YORK.

METHOD OF MAKING SCYTHES.

1,257,880. Specification of Letters Patent. Patented Feb. 26, 1918.

Application filed April 19, 1917. Serial No. 163,136.

*To all whom it may concern:*

Be it known that I, SAMUEL M. KITCHEN, a subject of the King of Great Britain, residing at Salem, in the county of Washington and State of New York, have invented certain new and useful Improvements in Methods of Making Scythes, of which the following is a specification.

This invention relates to an improved method of constructing scythes, and the invention relates particularly to the construction of the heel-end of the scythe blade and the tang, by which the blade is supported in operation.

The object of this invention is to provide a relatively thin scythe blade consisting of a single piece of high grade sheet tool steel, which requires a minimum of heating and forging operations to give it the proper shape. A further object is to suitably reinforce the heel-end of said blade and also the supporting tang, by overlaying said parts with a layer of sheet metal, which is subsequently welded preferably to the top face of the blank which comprises the blade. And a further object is to first heat and then subject the overlaid portion of the blade to a strong pressure by means of suitable dies for effecting the welding also for corrugating the reinforced portion of the blade for increasing the strength thereof. The corrugating and the welding of said parts preferably being accomplished by a single operation.

As a means suitable for the purpose and found very efficient in use, reference is made to the accompanying drawing, in which—

Figure 1 is a broken plan view of the sheet metal blank from which my improved scythe blade is made.

Fig. 2 is a broken plan view of the blank comprising the sheet metal reinforcing member.

Fig. 3 is a broken plan view of the two blanks assembled and "spot" welded for temporarily holding them together.

Fig. 4 is a broken plan view of the heel-end of the blade after the reinforcing member has been permanently welded to the blade proper, and the two layers of metal corrugated.

Fig. 5 is a transverse section taken on line 5—5 of Fig. 4.

Fig. 6 is a similar view taken on line 6—6 of Fig. 4, and

Fig. 7 is a longitudinal section taken on line 7—7 of Fig. 4.

In the drawing, 2 represents the blank from which the blade proper is made, which consists of a plain flat sheet of high carbon steel for producing a keen and lasting cutting edge 3 when properly tempered. The blank 2 is preferably normally of the proper gage throughout, and therefore does not require to be rolled or forged (except at the extreme heel-end) for bringing it to the proper thickness. 4 represents the back flange portion, which in the finished article is of the same thickness as the web 2', and is bent upwardly substantially at right angles to the said web for stiffening the whole blade (see Figs. 3, 4, 5 and 6) the broad heel-end portion 5 tapers upwardly toward the back flange 4 for providing a relatively narrow neck 6 to which is integrally joined a tang 7. The back flange 4 preferably extends partially across the rounded end of the tang for stiffening the neck 6.

It is known that a scythe blade is weakest at its heel-end which includes the portions 5 and 6, and the particular object of the present invention is to suitably reinforce the said parts, so as to give to the whole blade the requisite strength and stiffness to stand the work it is intended to perform. This reinforcement consists of overlaying a portion of the broad heel-end 5, as well as the neck 6 and the tang 7, with a sheet metal member or part 8, which is first blanked out of sheet steel or iron, preferably as shown in Fig. 2, having an angular web 8' and a tang 8''. The blank or plate 8 is disposed upon the blank 2 (see Fig. 3) where it is temporarily held in place by "spot" welding as indicated by the dotted lines x in Fig. 3. The "spot" welding being accomplished in a well known manner. The heel-end of the blank 2 and the attached blank 8 are next heated, and then placed in between suitable dies or forging tools, and subjected to sufficient pressure by blows or other means to effect the firm welding of the parts 2 and 8, as shown in Figs. 4, 5, 6 and 7. The dies (not shown) are preferably provided with grooves and tongues for forming two or more ribs 9 and 10 on the top side, and corresponding grooves or channels 9′ and 10′ in the bottom side of the blade. The rib 9 preferably extends from the neck 6 forwardly several inches substantially parallel to the back flange 4, while the rib 10 extends from a point about midway in the heel margin 5′ at an angle of approximately 45° to, and intersecting the rib 9 near its forward end. The ribs 9 and 10 are preferably tapered, their broad ends facing the tang 7 where the greatest strength is required. By this novel construction and arrangement of the heel-end of the blade, a large portion of said end is doubled in thickness. The rib 9 prevents the bending or buckling of the blade at its narrowest point—the neck 6, while the rib 10 prevents the broad heel portion 5 from twisting or warping when the scythe is in operation. Thus the weakest portions of the blade are adequately strengthened and stiffened. The ribs 9 and 10 are preferably so disposed that their outer edges 11 correspond to the margins 12 of the member 8. By this means the laps or joints between the members 2 and 8 are obscured. The back flange 4 may be bent up by means of the same dies employed for forming the ribs and grooves 9 and 10 at a single operation, if desired. In any event, the blade beyond the reinforced portion needs but one heating, therefore the high grade steel of which the blade is composed is not liable to be impaired. This latter feature is important when it is understood that by the old methods of constructing scythes, the blades were heated so many times that they were rendered soft and incapable of retaining sharp, cutting edges except for very short intervals. After the forging and bending operations have been completed, as described, the edge 3 is ground, and the blade is then ready for use.

My method for reinforcing the heel-ends of scythe blades is extremely simple, and practical, and it is believed to be new in the art. By reason of the said method, I am able to construct a scythe blade of great strength and durability, yet light in weight, having a keen and lasting cutting edge, and at the same time the cost of construction is materially reduced.

Having thus described my invention, what I claim, is—

1. The method of making scythes, which consists of preparing a sheet metal blank for the blade, then preparing a blank reinforcing member, then placing said blanks one upon the other and "spot" welding them, then heating the two thicknesses of metal, then subjecting said heated portions to a pressure by means of dies for permanently welding said blanks together, and at the same time forming corrugations within the area of said reinforcing member.

2. The herein described method, which consists of cutting a blank for a scythe blade from sheet steel and also a plate for a reinforcing member from the same material, then laying the said member upon the said blank and "spot" welding said parts, then heating the attached blanks, then inserting the said blanks between dies and permanently welding said parts together, then molding and forming a longitudinal rib and also an oblique rib within the area of said reinforcing member.

3. The method of making scythes which consists of cutting a blank for the blade, out of sheet steel, then cutting a smaller blank from the same material, then temporarily securing the smaller to the larger blank by "spot" welding, then heating the combined parts, then subjecting said heated parts to pressure between forging dies for permanently welding said parts and at the same time forming corresponding corrugations in the larger and smaller blanks, said corrugations disposed at an angle to and intersecting each other.

4. The method of reinforcing scythe blades, which consists of overlaying the heel-end and tang of the blade with a sheet metal reinforcing member, then "spot" welding said member to said blade, then heating both of said parts and subjecting them to pressure between dies for permanently welding the member and the blade into one part and at the same time forming a horizontal and also an oblique rib, one margin of each rib coinciding with the corresponding margin of said reinforcing member.

In testimony whereof I affix my signature.

SAMUEL M. KITCHEN.

Copies of this patent may be obtained for five cents each, by addressing the "Commissioner of Patents, Washington, D. C."